(12) United States Patent
Watanabe

(10) Patent No.: US 7,102,677 B2
(45) Date of Patent: Sep. 5, 2006

(54) REDUCED THERMAL RELEASE EFFECT AMPLIFICATION-TYPE SOLID IMAGING DEVICE AND METHOD OF DRIVING THE SAME

(75) Inventor: Takashi Watanabe, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 981 days.

(21) Appl. No.: 09/764,799

(22) Filed: Jan. 19, 2001

(65) Prior Publication Data

US 2001/0013899 A1   Aug. 16, 2001

(30) Foreign Application Priority Data

Feb. 14, 2000  (JP) ............... 2000-035801
Oct. 12, 2000  (JP) ............... 2000-312704

(51) Int. Cl.
*H04N 5/335* (2006.01)

(52) U.S. Cl. ........................ 348/308; 348/300

(58) Field of Classification Search .............. 348/294, 348/300, 241, 313, 243, 248, 308, 301
See application file for complete search history.

(56) References Cited

U.S. PATENT DOCUMENTS

| | | | |
|---|---|---|---|
| 4,521,106 A * | 6/1985 | Lambeth | 356/3.07 |
| 6,667,768 B1 * | 12/2003 | Fossum | 348/308 |
| 2003/0193597 A1 * | 10/2003 | Fossum et al. | 348/308 |

FOREIGN PATENT DOCUMENTS

| | | |
|---|---|---|
| JP | 2-196575 | 8/1990 |
| JP | 11-355668 | 12/1999 |
| KR | 2000-5962 | 1/2000 |

OTHER PUBLICATIONS

See Korean Patent Office Action dated Feb. 26, 2003.
Y. Sone, et al. "New Driving Method of CPD Solid-State Imaging Sensor", Technical Report of the Television Society, ED 621, 1982, pp. 1-6.
R. M. Guidash, et al. "A 0.6μCMOS Pinned Photodiode Color Imager Technology." IEDM, 1997.

* cited by examiner

*Primary Examiner*—David L. Ometz
*Assistant Examiner*—Heather R. Long
(74) *Attorney, Agent, or Firm*—David C. Conlin; David A. Tucker; Edwards & Angell, LLP

(57) ABSTRACT

A solid imaging device includes at least one pixel, the pixel including a photoelectric conversion section and a charge detection node which are coupled to or decoupled from each other via a transfer gate transistor, the charge detection node being coupled to or decoupled from a drain of a reset gate transistor via the reset gate transistor. After the reset gate resets a potential of the charge detection node, the transfer gate transistor is turned ON so as to allow a signal charge to be transferred from the photoelectric conversion section to the charge detection node, and thereafter a potential of the drain is changed from a HIGH state to a LOW state to a HIGH state while both of the transfer gate transistor and the reset gate transistor are maintained in an ON state.

16 Claims, 9 Drawing Sheets

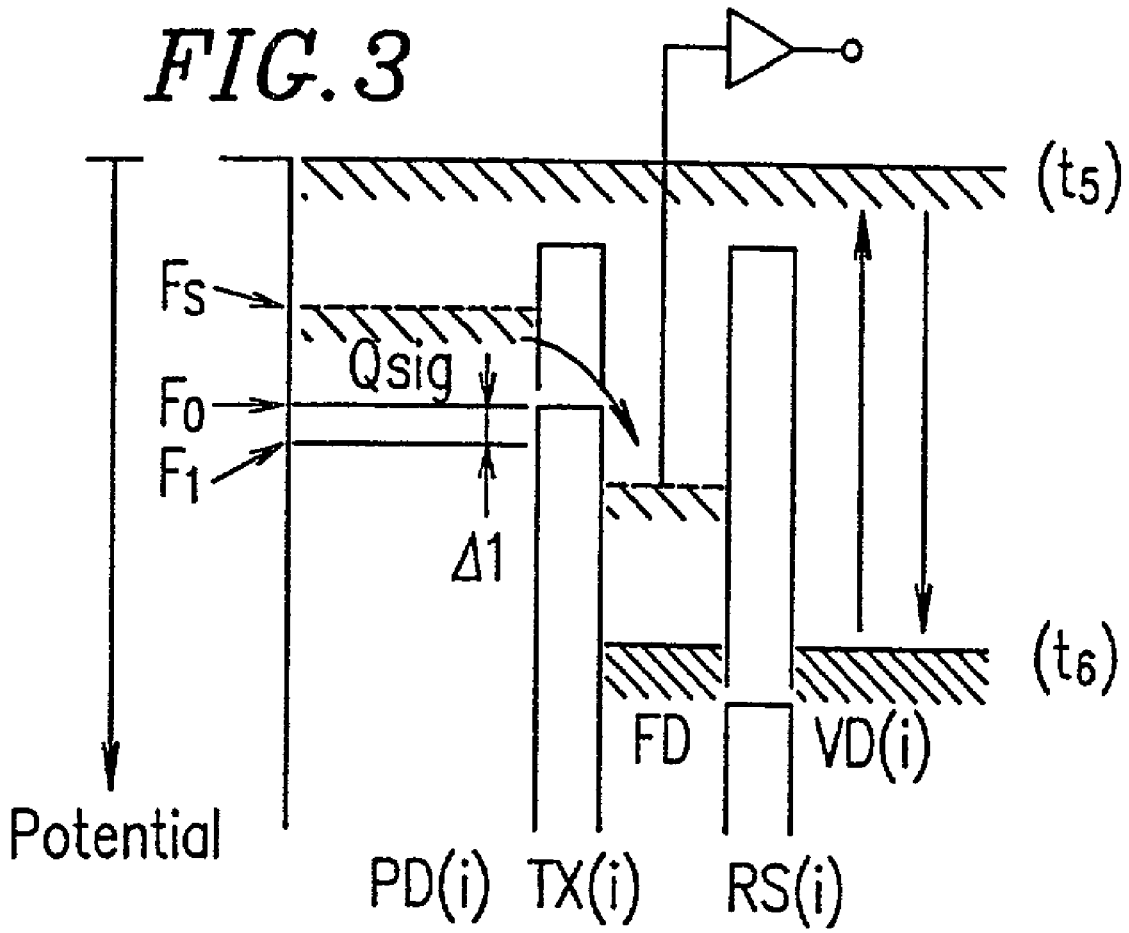
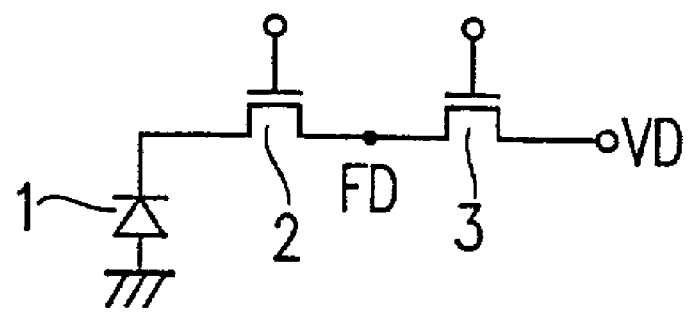
FIG.3

CONVENTIONAL ART
FIG. 9
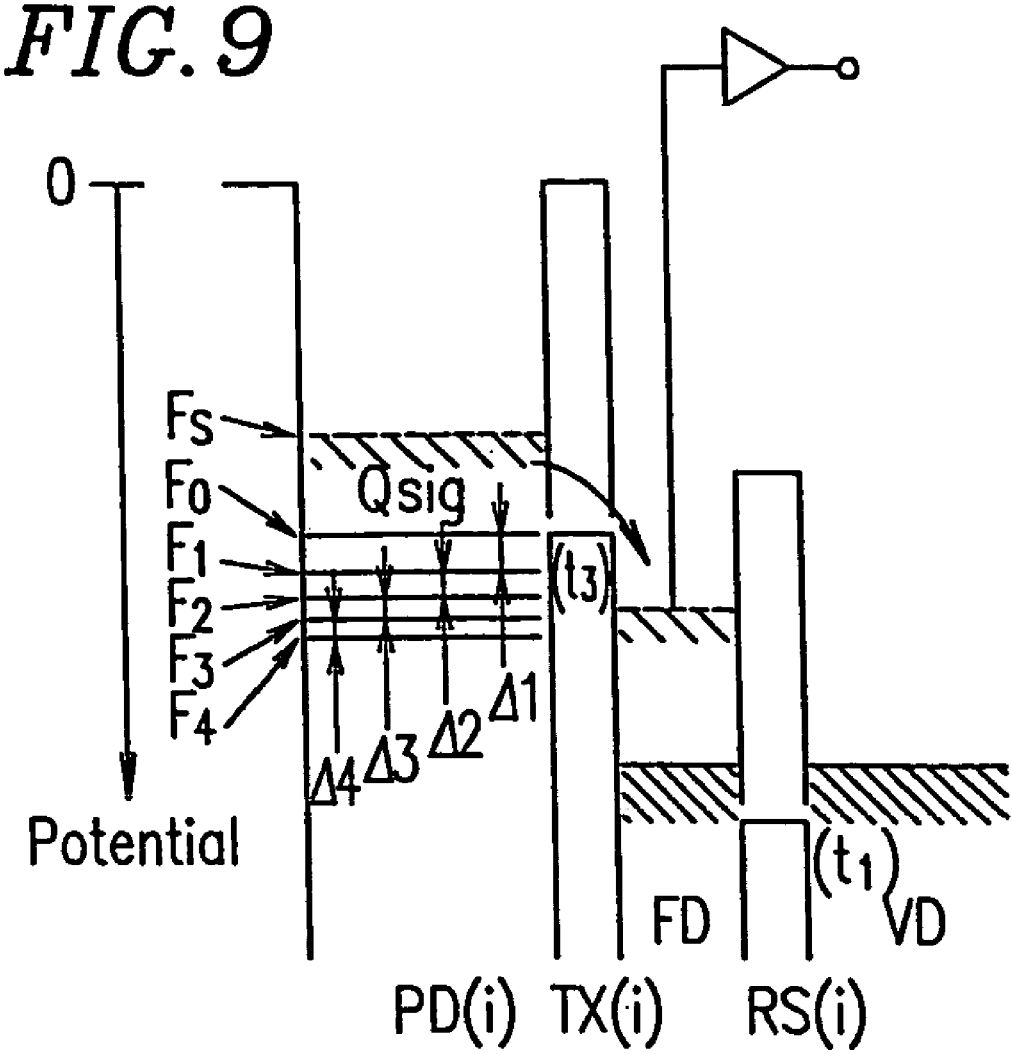
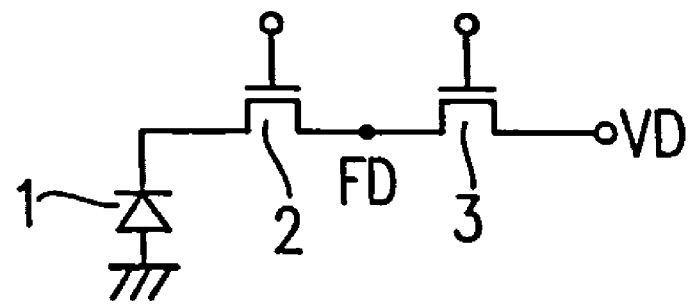

REDUCED THERMAL RELEASE EFFECT AMPLIFICATION-TYPE SOLID IMAGING DEVICE AND METHOD OF DRIVING THE SAME

BACKGROUND OF THE INVENTION

1. Field of the Invention

The present invention relates to a solid imaging device which operates by a novel driving method.

2. Description of the Related Art

Conventional amplification type solid imaging devices have been proposed which include a pixel section, including pixels each having an amplification function, and scanning circuitry provided in the periphery of the pixel section for reading pixel data. In particular, APS (active pixel sensor type) image sensors are known as amplification-type solid imaging devices in which pixel structures are constructed from CMOS elements, which facilitates integration with peripheral driving circuitry and signal processing circuitry.

In accordance with an APS image sensor structure, it is necessary to provide a photoelectric conversion section, an amplification section, a pixel selection section, and a reset section within one pixel. Furthermore, an APS image sensor includes 3 or 4 MOS transistors (T) in addition to the number of photodiodes (PD) usually composing the photoelectric conversion section.

FIG. 7 shows the structure of an APS image sensor of a "PD+4T" structure, incorporating one photodiode (PD) and four MOS transistors. A "PD+4T" structure is disclosed in R. M. Guidash et al., IEDM Tech. Digest, p. 927(1997).

Each pixel in the APS image sensor shown in FIG. 7 includes a photodiode (PD) 1, and four transistors, i.e., a transfer gate transistor 2, a reset gate transistor 3, an amplification transistor 4, and a pixel selection transistor 5.

A charge transfer clock line 12, a reset clock line 13, and a pixel selection clock line 15 supply driving pulse voltages, i.e., VTX, VRS, and VSE, respectively, along the horizontal direction. The charge transfer clock line 12, the reset clock line 13, and the pixel selection clock line 15 are coupled to vertical scanning circuits 23, 22, and 21, respectively. Driving pulse voltages VRS(i), VSE(i), and VTX(i) for an $i^{th}$ row are applied to the gate of the reset gate transistor 3, the gate of the pixel selection transistor 5, and the gate of the transfer gate transistor 2, respectively.

A power line 14 and a vertical signal line 16 are provided for respective pixels along the vertical direction as shown in FIG. 7. A load transistor 17 is coupled to the vertical signal line 16 for each column of pixels. A signal on the vertical signal line 16 is transmitted to a horizontal signal line 36 via a driving transistor 31 and a horizontal selection switching transistor 32.

The horizontal selection switching transistor 32 is driven by a horizontal scanning signal 35 provided from a horizontal scanning circuit 34. A load transistor 33 is coupled to the horizontal signal line 36. A signal on the horizontal signal line 36 is amplified by a buffer amplifier 37 so as to be output as an output signal OS. Reference numeral VD represents a constant voltage supply power.

FIG. 8 is a timing diagram illustrating the circuit operation of the "PD+4T" structure shown in FIG. 7.

Driving pulse voltages VRS(i), VSE(i), and VTX(i) for an $i^{th}$ row and driving pulse voltages VRS(i+1), VSE(i+1), and VTX(i+1) for an i+1$^{th}$ row have respectively similar waveforms but are one horizontal scanning period (1H) apart from one another. The following description will be directed to the $i^{th}$ row.

During a period t1, the reset gate transistor 3 (RS(i)) is turned ON. Since this causes a decrease in the gate potential energy, the charge shifts from a charge detection node FD (FIG. 7) to the drain of the reset gate transistor 3 (RS(i)). As a result, the potential of the charge detection node FD is reset to a supply voltage VD.

During a period t2, the reset gate transistor 3 (RS(i)) is turned OFF, but the charge detection node FD is maintained at the potential VD, which existed at the time of resetting.

During a period t3, the transfer gate transistor 2 (TX(i)) is turned ON. Since this causes a decrease in the gate potential energy, the signal charge which is stored in the photodiode 1 (PD) is transferred to the charge detection node FD.

During a period t4, the transfer gate transistor 2 (TX(i)) is turned OFF, but the charge detection node FD is maintained at the potential which existed at the time of signal charge transfer.

During a period t6, the transfer gate transistor 2 (TX(i)) and the reset gate transistor 3 (RS(i)) are both turned ON. Since this causes a decrease in the gate potential energy in both transistors 2 and 3, the charge shifts from the photodiode 1 (PD) and the charge detection node FD to the drain of the reset gate transistor 3 (RS(i)). As a result, the potential of the photodiode 1 (PD) is reset to a potential (Fk) which is dependent on a transfer gate transistor high level (described later), and the potential of the charge detection node FD is reset to the supply voltage VD.

During a period t7, the transfer gate transistor 2 (TX(i)) is turned OFF, so as to isolate the photodiode 1 (PD) from external circuitry. The period t7 is a preliminary period for isolating the charge detection node FD, as well as the photodiode 1 (PD), from external circuitry after fixing the potential of the photodiode 1 (PD) at the potential (Fk) which is dependent on the transfer gate transistor high level.

During the periods t1 to t4, the driving pulse voltage (VSE(i)) on the pixel selection clock line 15 is applied to the gate of the pixel selection transistor 5, whereby the pixel selection transistor 5 is turned ON. Therefore, a detection signal obtained at the charge detection node FD during the periods t1 to t4 is output to the vertical signal line 16.

The circuit operation during the periods t1 to t7 occurs during a horizontal blanking period H-BLK. The reset signal and the detection signal appear on the vertical signal line 16 during the periods t2 and t4, respectively. Therefore, a net signal value can be obtained by calculating a difference between the signal levels during the period t2 and the period t4 through a subsequently-performed correlated double sampling (CDS) process. These signals are sequentially read by the horizontal scanning circuit 34 during a horizontal effective period (H-EFF).

The circuit structure shown in FIG. 7 and the circuit operation shown in FIG. 8 may experience the following problems when the charge is transferred from the photodiode 1 (PD) to the charge detection node FD.

FIG. 9 shows potential energies appearing at the photodiode 1 (PD(i)), transfer gate transistor 2 (TX(i)), and the reset gate transistor 3 (RS(i)). The circuit operation illustrated in FIG. 9 is now described with reference to the timing diagram of FIG. 8.

After the charge detection node FD is reset to the supply voltage VD during the period t1 (FIG. 8), the amount of signal charge stored in the photodiode 1 (PD(i)) is read during the period t3. The amount of signal charge read at this time, which in theory would correspond to the difference between a signal level potential energy Fs and a high level potential energy F0 of the transfer gate transistor 2 (TX(i)) in an ON state (i.e., Fs−F0), is actually greater than that by Δ1 (i.e., Fs−F1). This is because excess charge is released from the photodiode 1 (PD(i)) in a floating state, beyond a potential energy barrier Δ1, due to thermal release effects.

This phenomenon occurs after every signal read operation. As a relatively "dark" signal state (i.e., a signal state under no light irradiation) continues over several read periods after a relatively "bright" signal state (i.e., a signal state under incident light), the potential energy level of the photodiode 1 (PD(i)) after each read operation becomes gradually deeper, e.g., Δ2, Δ3, and Δ4. This indicates that a low level signal is being output even during a dark signal state. When a bright signal state occurs again, the signal charge will be stored but only from a deep potential level, resulting in a corresponding decrease in the final signal charge level.

Therefore, the signal charge amount experiences a decrease when a dark signal state is followed by a bright signal state, whereas an extra signal charge amount is output when a bright signal state is followed by a dark signal state. In other words, a so-called residual image phenomenon occurs in the circuit structure shown in FIG. 7 and the circuit operation shown in FIG. 8.

The reset gate transistor 3 (RS(i)) shown in FIG. 9 is of an embedded channel type, and has a deeper potential energy than that of the transfer gate transistor 2 (TX(i)).

It is known in the art that the residual image phenomenon can be effectively controlled by introducing a bias charge. For example, a BBD (bucket brigade device) which essentially repeats operations similar to those above, can be used to introduce a constant bias charge other than the signal charge. In the case of a photodiode incorporated in an image sensor, bias charge may be introduced by providing bias light. However, provision of bias light will impose a substantial burden on the actual use of the device and result in an increase in photoelectric conversion noise.

Another method has been proposed which involves separately providing a charge injection region in a photodiode, once injecting bias charge into the photodiode via the charge injection region, and returning the charge from the photodiode back into the charge injection region through skimming transfer, thereby leaving in the photodiode just an amount of charge which corresponds to the difference between the injected amount and the transferred amount (Sone et al., technical report of the Television Society, ED621, (1982)). There is an example of applying this method to a photoelectric membrane stack type CCD (Japanese Laid-Open Patent Publication No. 2-196575). These method require the additional use of a charge injection region (e.g., an input source) and a control gate (e.g., a skimming control gate TG2), which presents a serious problem concerning the substrate layout of amplification type solid imaging devices which require a high density arrangement of pixels.

Another solution has been proposed which involves the use of a photodiode which is of a complete depletion layer type so that no signal charge is left in the photodiode at the time of reading. This structure requires covering the photodiode surface with a high concentration layer of an opposite polarity, so that a relatively high voltage is required at the time of reading. This detracts from the known advantages of CMOS type image sensors, i.e., low driving voltage, and low consumption power, and therefore cannot be tolerated.

SUMMARY OF THE INVENTION

According to the present invention, there is provided a solid imaging device including at least one pixel, the pixel including a photoelectric conversion section and a charge detection node which are coupled to or decoupled from each other via a transfer gate transistor, the charge detection node being coupled to or decoupled from a drain of a reset gate transistor via the reset gate transistor, wherein, after the reset gate resets a potential of the charge detection node, the transfer gate transistor is turned ON so as to allow a signal charge to be transferred from the photoelectric conversion section to the charge detection node, and thereafter a potential of the drain is changed from a HIGH state to a LOW state to a HIGH state while both of the transfer gate transistor and the reset gate transistor are maintained in an ON state.

In one embodiment of the invention, the solid imaging device further includes an amplification transistor for amplifying a variation in the potential of the charge detection node and a pixel selection transistor for selectively reading an output signal from the amplification transistor, wherein the potential of the drain is varied after an amplified signal of the signal charge is read via the amplification transistor and the pixel selection transistor, thereby presetting a potential of the photoelectric conversion section to a constant potential after the read operation.

In another embodiment of the invention, the transfer gate transistor, the reset gate transistor, the amplification transistor, and the pixel selection transistor are formed of MOS transistors of a same polarity type.

In still another embodiment of the invention, the transfer gate transistor and the reset gate transistor are embedded channel-type MOS transistors.

In still another embodiment of the invention, a HIGH level of a pulse voltage for driving the transfer gate transistor is lower than a HIGH level of a pulse voltage for driving the reset gate transistor.

In still another embodiment of the invention, a period t1 during which the signal charge is transferred from the photoelectric conversion section to the charge detection node and a period t2 after the potential of the drain is changed from the LOW state to the HIGH state until the transfer gate transistor is turned OFF satisfy the relationship t1=t2.

In still another embodiment of the invention, a plurality of said pixels are arranged in a matrix, wherein the drains of the reset gate transistors in each row of the matrix are interconnected, independently from row-to-row, so as to be connected to a scanning circuit, and wherein the scanning circuit sequentially applies pulse voltages to the drains on a row-by-row basis.

In still another embodiment of the invention, the solid imaging device further includes a correlated double sampling circuit for calculating a difference between a signal charge immediately after the potential of the charge detection node is reset and a signal charge immediately after the signal charge is transferred from the photoelectric conversion section to the charge detection node, and outputting the calculated difference as a net signal component representing a net signal charge.

In another aspect of the present invention, there is provided a method for driving a solid imaging device including at least one pixel, the pixel including a photoelectric conversion section and a charge detection node which are coupled to or decoupled from each other via a transfer gate transistor, the charge detection node being coupled to or decoupled from a drain of a reset gate transistor via the reset gate transistor, wherein the method includes the steps of: resetting via the reset gate transistor a potential of the charge detection node; thereafter turning allowing a signal charge to be transferred from the photoelectric conversion section to the charge detection node by the transfer gate transistor ON; and thereafter changing a potential of the drain from a HIGH state to a LOW state to a HIGH state while maintaining both of the transfer gate transistor and the reset gate transistor in an ON state.

In one embodiment of the invention, the solid imaging device further includes an amplification transistor for amplifying a variation in the potential of the charge detection node and a pixel selection transistor for selectively reading an output signal from the amplification transistor, the method further including, after the step of allowing the signal charge to be transferred, a step of varying the potential of the drain after an amplified signal of the signal charge is read via the amplification transistor and the pixel selection transistor, thereby presetting a potential of the photoelectric conversion section to a constant potential after the or each read operation.

In another embodiment of the invention, the transfer gate transistor, the reset gate transistor, the amplification transistor, and the pixel selection transistor are formed of MOS transistors of a same polarity type.

In still another embodiment of the invention, the transfer gate transistor and the reset gate transistor are embedded channel-type MOS transistors.

In still another embodiment of the invention, a HIGH level of a pulse voltage for driving the transfer gate transistor is lower than a HIGH level of a pulse voltage for driving the reset gate transistor.

In still another embodiment of the invention, a period t1 for performing a charge transfer from the photoelectric conversion section to the charge detection node and a period t2 after the potential of the drain is changed from the LOW state to the HIGH state until the transfer gate is turned OFF satisfy the relationship t1=t2.

In still another embodiment of the invention, a plurality of said pixels are arranged in a matrix, wherein the drains of the reset gate transistors in each row of the matrix are interconnected, independently from row-to-row, so as to be connected to a scanning circuit, the method further including the step of: sequentially applying from the scanning circuit pulse voltages to the drains on a row-to-row basis.

In still another embodiment of the invention, the solid imaging device further includes a correlated double sampling circuit for calculating a difference between a signal charge immediately after the potential of the charge detection node is reset and a signal charge immediately after the signal charge is transferred from the photoelectric conversion section to the charge detection node, and outputting the calculated difference as a net signal component representing a net signal charge.

Thus, the invention described herein makes possible the advantage of providing a solid imaging device which is substantially free from a residual image phenomenon resulting from insufficient charge transfer and which has low noise and high sensitivity and yet provides high image quality; and a method for driving the same.

This and other advantages of the present invention will become apparent to those skilled in the art upon reading and understanding the following detailed description with reference to the accompanying figures.

BRIEF DESCRIPTION OF THE DRAWINGS

FIG. 3 schematic representation illustrating potential energies appearing at various elements, as well as the interconnection therebetween, during a circuit operation of the solid imaging device illustrated in FIGS. 1 and 2.

FIG. 9 is a schematic representation illustrating potential energies appearing at various elements, as well as the interconnection therebetween, during a circuit operation of a conventional solid imaging device.

DESCRIPTION OF THE PREFERRED EMBODIMENTS

Hereinafter, the present invention will be described by way of examples, with reference to the accompanying figures.

Figure 1:
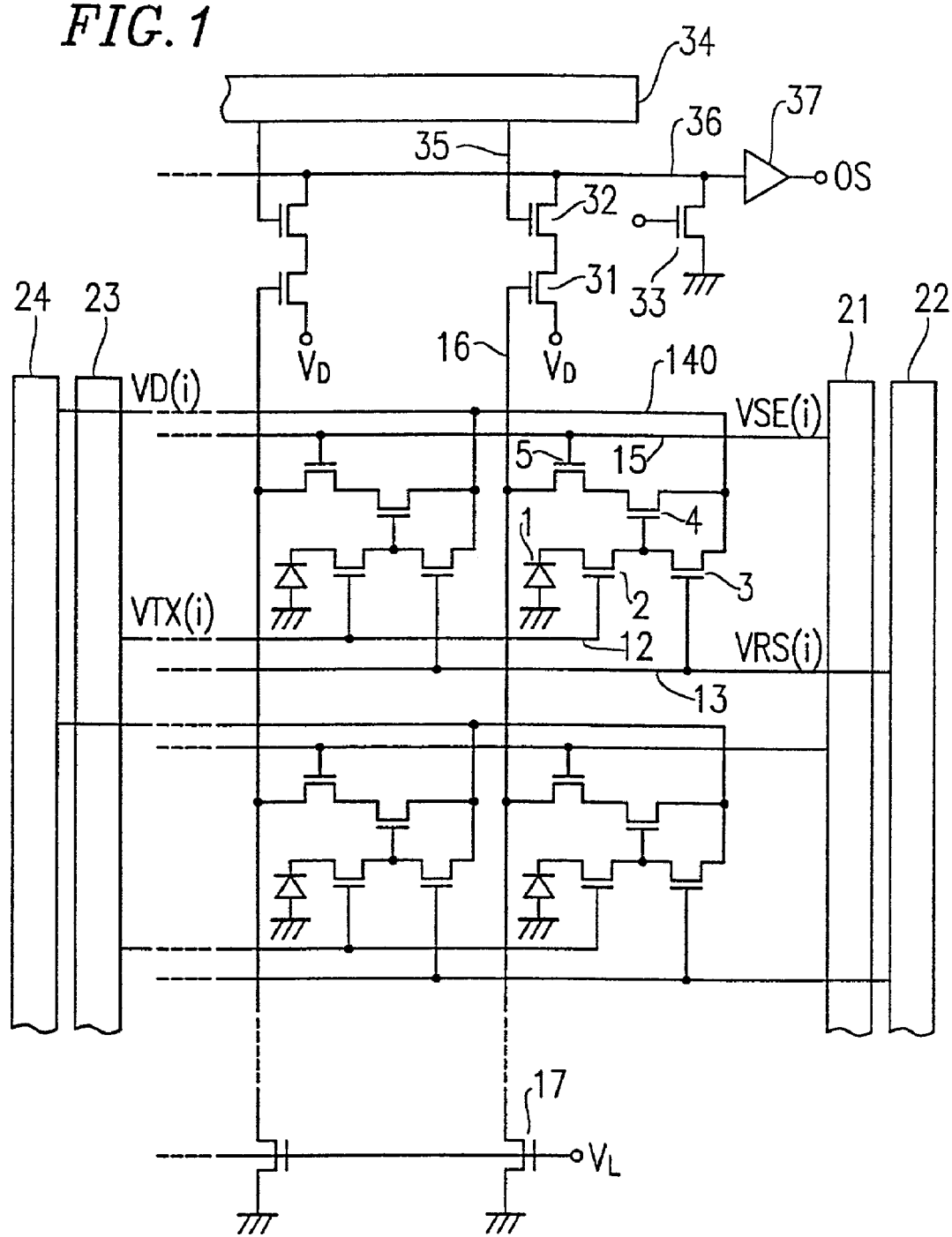
FIG. 1 is a circuit diagram illustrating an exemplary structure of the solid imaging device according to the present invention having four pixels.

FIG. 1 is a circuit diagram illustrating an exemplary structure of the solid imaging device according to the present invention having four pixels.

Each pixel includes a photodiode 1, a transfer gate transistor 2, a reset gate transistor 3, an amplification transistor 4, and a pixel selection transistor 5.

A charge transfer clock line 12, a reset clock line 13, and a pixel selection clock line 15 supply driving pulse voltages, i.e., VTX, VRS, and VSE, respectively, along the horizontal direction. A supply line 140 which is coupled to the drain of the reset gate transistor 3 and the drain of the amplification transistor 4 supplies power pulse voltages. The charge transfer clock line 12, the reset clock line 13, the pixel selection clock line 15, and the supply line 140 are coupled to vertical scanning circuits 23, 22, 21, and 24, respectively.

Driving pulse voltages VRS(i), VSE(i), and VTX(i) for an $i^{th}$ row are applied to the gate of the reset gate transistor 3, the gate of the pixel selection transistor 5, and the gate of the transfer gate transistor 2, respectively. A supply pulse voltage VD(i) for an $i^{th}$ row is applied to the drain of the reset gate transistor 3 and the drain of the amplification transistor 4.

A vertical signal line 16 is provided for respective pixels along the vertical direction as shown in FIG. 1. A load transistor 17 is coupled to the vertical signal line 16 for each column of pixels. A signal on the vertical signal line 16 is transmitted to a horizontal signal line 36 via a driving transistor 31 and a horizontal selection switching transistor 32. The horizontal selection switching transistor 32 is driven by a signal provided from a horizontal scanning circuit 34. A load transistor 33 is coupled to the horizontal signal line 36. A signal on the horizontal signal line 36 is amplified by a buffer amplifier 37 so as to be output as an output signal OS.

Figure 2:
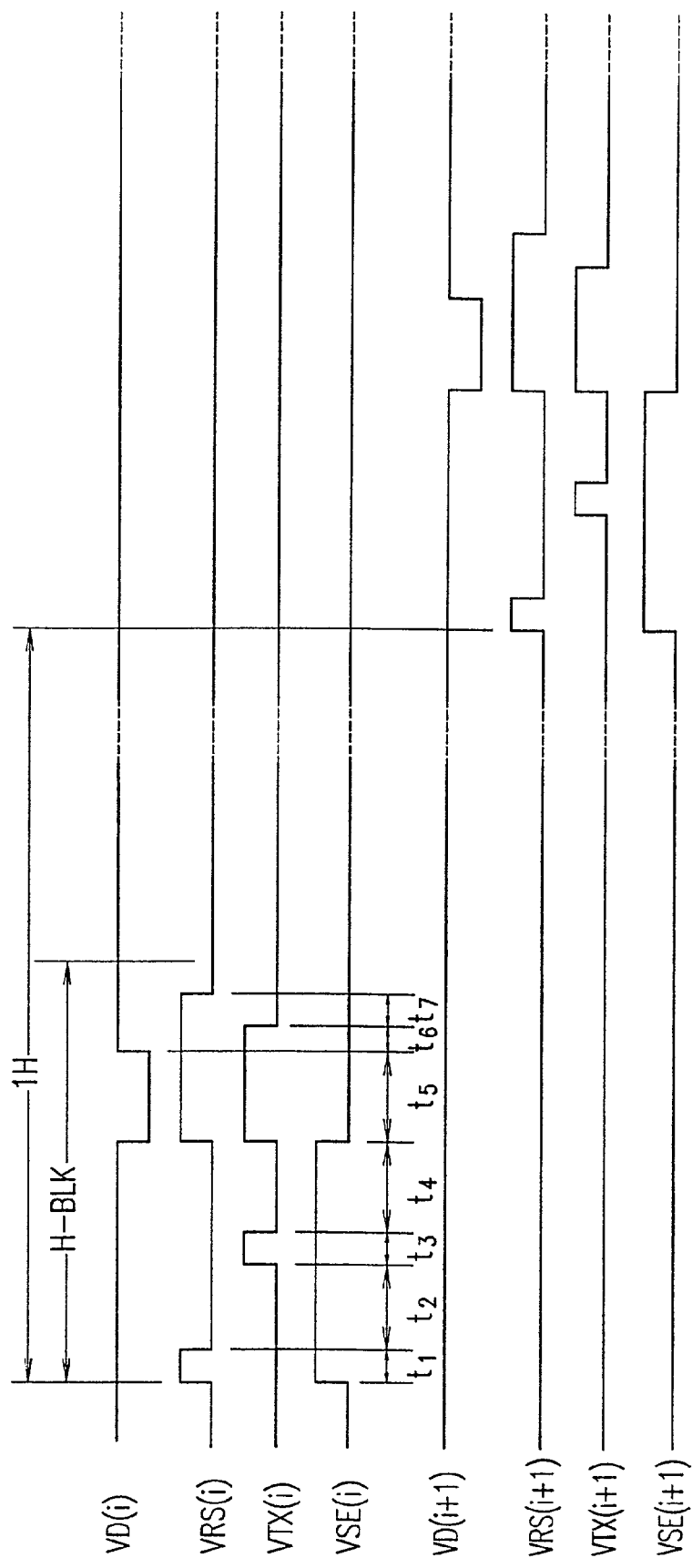
FIG. 2 is a timing diagram illustrating various driving pulse voltages used in the solid imaging device shown in FIG. 1.

FIG. 2 is a timing diagram illustrating the circuit operation of the solid imaging device having the structure shown in FIG. 1. Driving pulse voltages VRS(i), VSE(i), and VTX(i) for an $i^{th}$ row and driving pulses VRS(i+1), VSE(i+1), and VTX(i+1) for an i+1$^{th}$ row have similar waveforms but are one horizontal scanning period (1H) apart from one another. Likewise, a supply pulse voltage VD(i) for an $i^{th}$ row and a supply pulse voltage VD(i+1) for an i+1$^{th}$ row have similar waveforms but are one horizontal scanning period (1H) apart from each other. The following description will be directed to the $i^{th}$ row.

According to the present invention, the supply voltage VD also varies in synchronization with a read operation. The supply voltage VD is applied to the drain of the reset gate transistor 3 and the drain of the amplification transistor 4. As such, the waveform of the supply voltage VD has a waveform (shown as supply pulse voltages VD(i) in FIG. 2) which varies along the horizontal direction on a row-by-row basis.

During a period t1, the reset gate transistor 3 (RS(i)) is turned ON. Since this causes a decrease in the gate potential energy, the charge shifts from the drain of the reset gate transistor 3 (RS(i)) to a charge detection node FD. As a result, the potential of the charge detection node FD is reset to a supply pulse voltage VD(i).

During a period t2, the reset gate transistor 3 (RS(i)) is turned OFF, but the charge detection node FD is maintained at the potential VD(i), which existed at the time of resetting.

During a period t3, the transfer gate transistor 2 (TX(i)) is turned ON. Since this causes a decrease in the gate potential energy, the signal charge which is stored in the photodiode 1 (PD) is transferred to the charge detection node FD.

During a period t4, the transfer gate transistor 2 (TX(i)) is turned OFF, but the charge detection node FD is maintained at the potential which existed at the time of signal charge transfer. Up to this period, the supply pulse voltage VD(i) and the driving pulse voltage VSE(i) are maintained at their respective HIGH levels.

During the periods t1 to t4, the driving pulse voltage (VSE(i)) on the pixel selection clock line 15 is applied to the gate of the pixel selection transistor 5, whereby the pixel selection transistor 5 is turned ON. Therefore, a detection signal obtained at the charge detection node FD during the periods t1 to t4 is output to the vertical signal line 16.

FIG. 3 shows potential energies appearing on the photodiode 1 (PD(i)), transfer gate transistor 2 (TX(i)), and the reset gate transistor 3 (RS(i)) as well as the interconnection between elements associated with the charge detection node FD.

The circuit operation illustrated in FIG. 3 during the periods t1 to t4 can be described as follows.

After the charge detection node FD is reset to the supply pulse voltage VD(i) during the period t1 (FIG. 2), the amount of signal charge stored in the photodiode 1 (PD(i)) is read during the period t3. The amount of signal charge read at this time, which in theory would correspond to the difference between a signal level potential energy Fs and a high level potential energy F0 of the transfer gate transistor 2 (TX(i)) in an ON state, is actually greater than that by Δ1 (i.e., Fs–F1). This is because excess charge is released from the photodiode 1 (PD(i)) in a floating state, beyond a potential energy barrier Δ1, due to thermal release effects.

According to the present invention, however, this phenomenon occurs only once, and never again thereafter, whether a bright signal state changes to a dark signal state, or vice versa. The reset level of the potential energy of the photodiode 1 (PD(i)) is always fixed at F1. Given below is an explanation of the solution provided by the present invention, which is accomplished through the operations during the periods t5 to t7.

Now, the operations during the periods t5 to t7 will be described with reference to FIGS. 2 and 3.

During the period t5, the supply pulse voltage VD(i) is at a LOW level, and the transfer gate transistor 2 (TX(i)) and the reset gate transistor 3 (RS(i)) are turned ON. Therefore, charge is injected from the drain of the reset gate transistor 3 (RS(i)) into the photodiode 1 (PD(i)).

During the period t6, the supply pulse voltage VD(i) again goes HIGH, and the transfer gate transistor 2 (TX(i)) and the reset gate transistor 3 (RS(i)) are still in an ON state. Therefore, a portion of the charge injected into the photodiode 1 (PD(i)) by which it exceeds the high level potential energy F0 of the transfer gate transistor 2 (TX(i)) in an ON state is allowed to flow back to the drain of the reset gate transistor 3 (RS(i)), so that the potential of the photodiode 1 (PD(i)) is preset.

At this time, the photodiode 1 (PD(i)) behaves in the same manner as during the period t3, resulting in the same potential energy as that existing during the period t3. Therefore, due to thermal release effects, the amount of signal charge read at this time corresponds to a potential energy F1, which is Δ1 deeper than the high level potential energy F0 of the transfer gate transistor 2 (TX(i)) in an ON state. Thus, once the signal charge is read, the reset level of the potential energy of the photodiode 1 (PD(i)) is always fixed at the constant potential F1.

The potential variation due to thermal release effects varies over time in a logarithmic manner. Accordingly, by prescribing that t3=t6, the potential variation occurring during these periods can be equalized. This principle is illustrated in FIG. 4 with respect to the variation in the potential $\Phi_{PD}$ of the photodiode 1 (PD(i)).

The circuit operations during the periods t5 to t6 serve to maintain the potential of the photodiode 1 (PD(i)) at a fixed value each time signal charge is read from the photodiode 1 (PD(i)). As a result, irrespective of whether a bright signal state changes to a dark signal state, or vice versa, and irrespective of the signal durations, signal charge will always be stored from the same reference potential F1, whereby the residual image phenomenon can be prevented.

During the period t7, the gate potential of the transfer gate transistor 2 (TX(i)) goes LOW so as to isolate the photodiode 1 (PD) from external circuitry. The period t7 serves as a preliminary period for isolating the charge detection node FD, as well as the photodiode 1 (PD), from external circuitry after fixing the potential of the photodiode 1 (PD) at the aforementioned potential (energy) F1.

Figure 4:
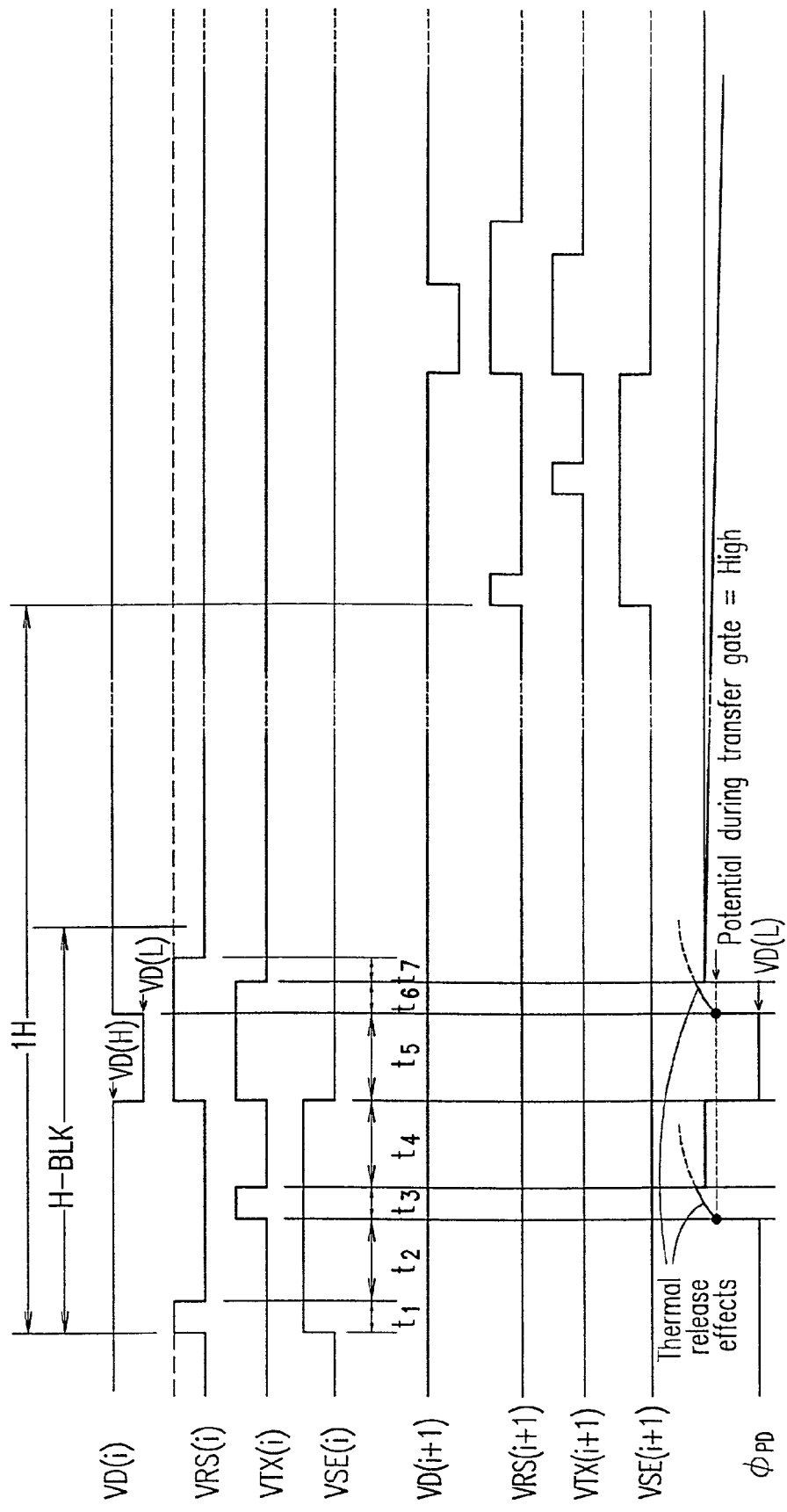
FIG. 4 is another timing diagram illustrating various driving pulse voltages used in the solid imaging device shown in FIG. 1.

Alternatively, as indicated by the broken line shown at VRS(i) in FIG. 4, it is possible to leave the charge detection node FD coupled to, rather than isolated from, the supply pulse voltage VD(i) after the period t7 and until the next read operation occurs, i.e., a next t1.

Referring back to FIG. 3, the reset gate transistor 3 (RS(i)) and the transfer gate transistor 2 (TX(i)) are of an embedded channel type, and constructed so that they are not turned OFF even when driving pulse voltages VRS(i) and VTX(i) are at the LOW level. Accordingly, even when excessive light is incident on the photodiode 1 (PD(i)) during storage of signal charge (i.e., both TX and RS are at the LOW level), the resultant excessive signal charge will be drained to the drain of the reset gate transistor 3 (RS(i)), thereby minimizing a so-called blooming problem.

The HIGH level of the driving pulse voltage VTX(i) for the transfer gate transistor 2 (TX(i)) is prescribed at a lower value than the driving pulse voltage VRS(i) for the reset gate transistor 3 (RS(i)). Therefore, all of the signal charge within the photodiode 1 (PD(i)) is transferred to the charge detection node FD during a signal read operation, thereby making it possible to maintain a relatively high charge-voltage conversion gain.

Figure 5:
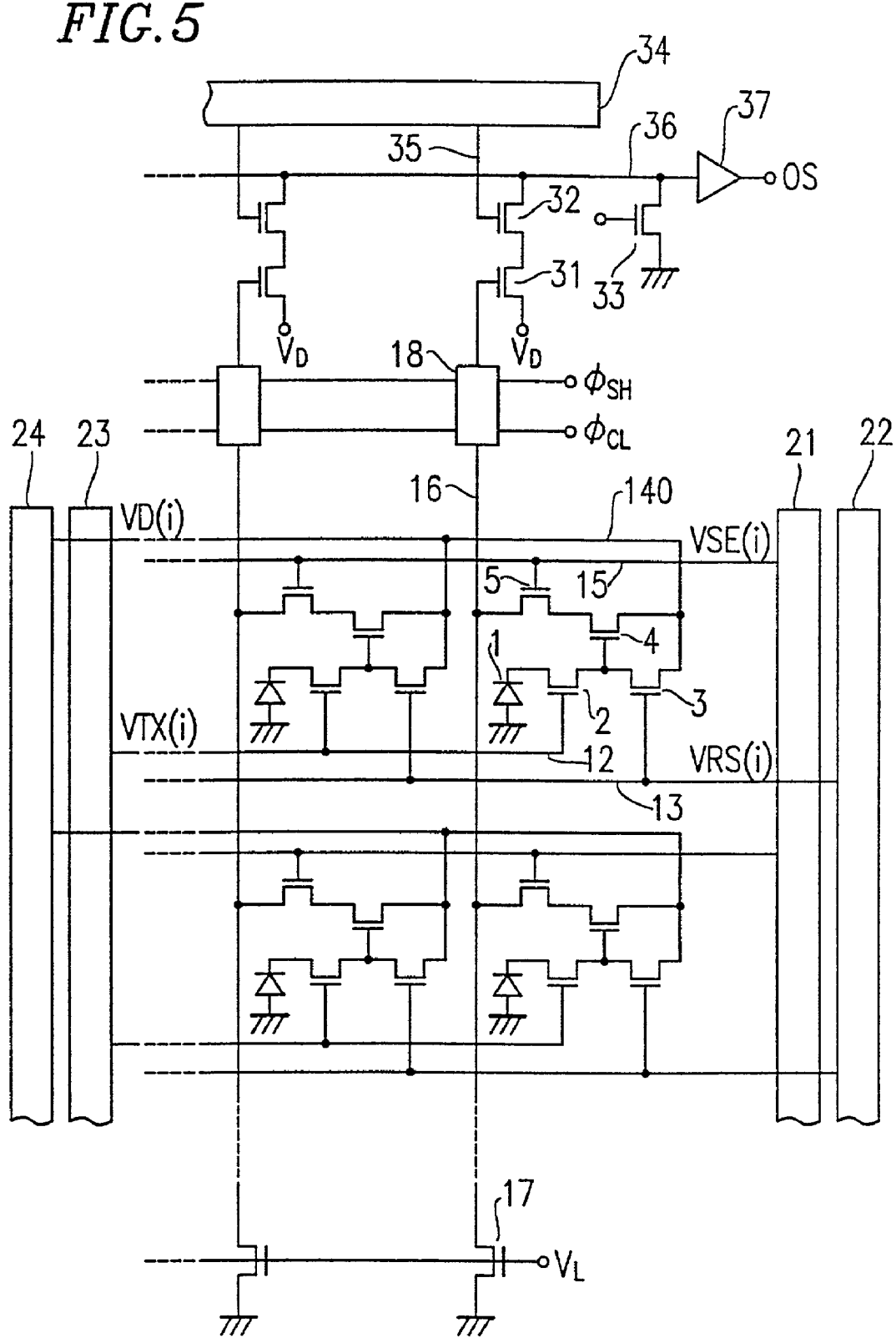
FIG. 5 is a circuit diagram illustrating another exemplary structure of the solid imaging device according to the present invention having four pixels.

FIG. 5 is a circuit diagram illustrating another exemplary structure of the solid imaging device according to the present invention having four pixels. The solid imaging device structure shown in FIG. 5 is identical with that shown in FIG. 1 except that a correlated double sampling (CDS) circuit 18 is inserted immediately before the driving transistor 31 within the vertical signal line 16. A clamp clock signal $\phi_{CL}$ and a sample/hold clock signal $\phi_{SH}$ are applied to the correlated double sampling (CDS) circuit 18.

Figure 6:
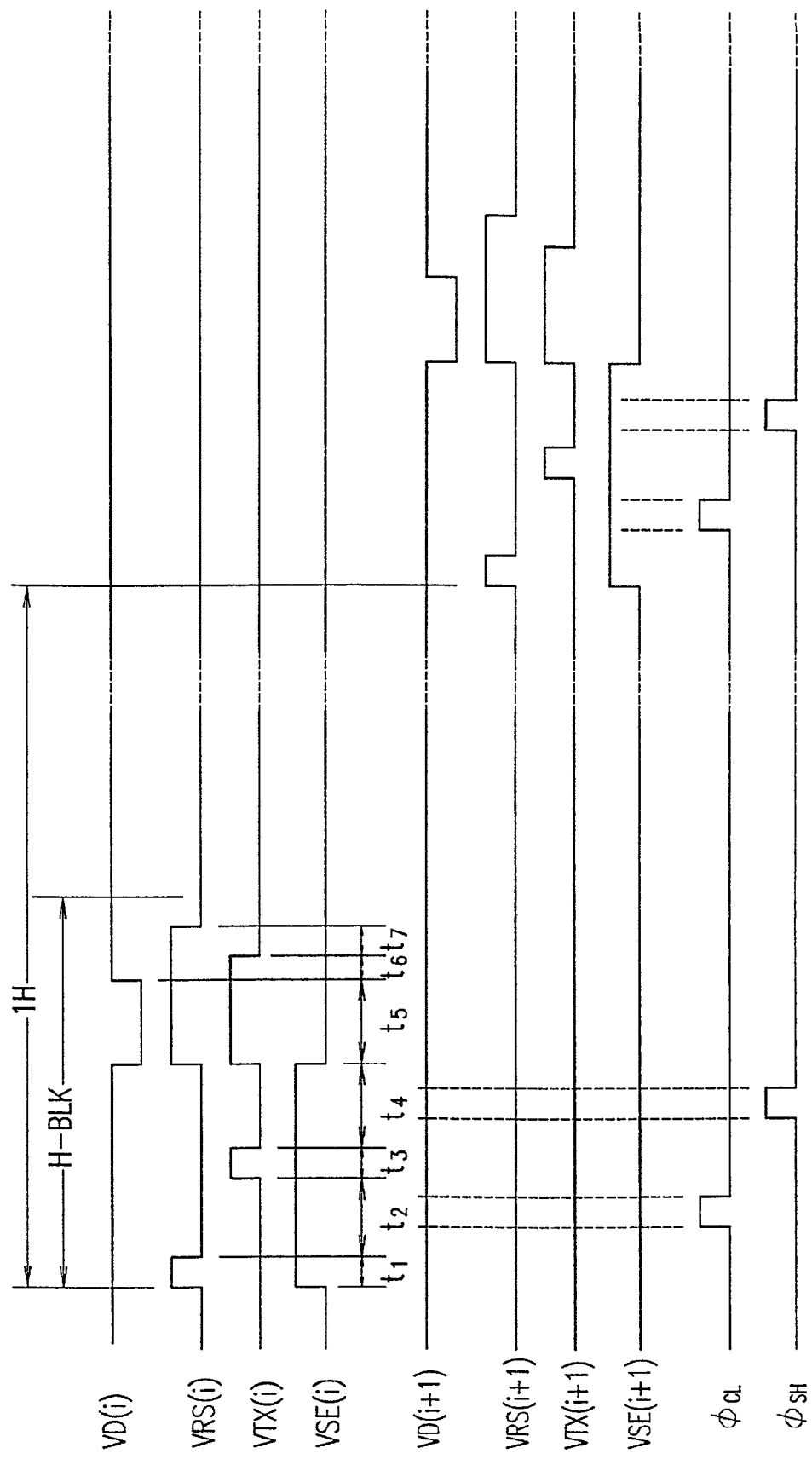
FIG. 6 is a timing diagram illustrating various driving pulse voltages used in the solid imaging device shown in FIG. 5.
Figure 7:
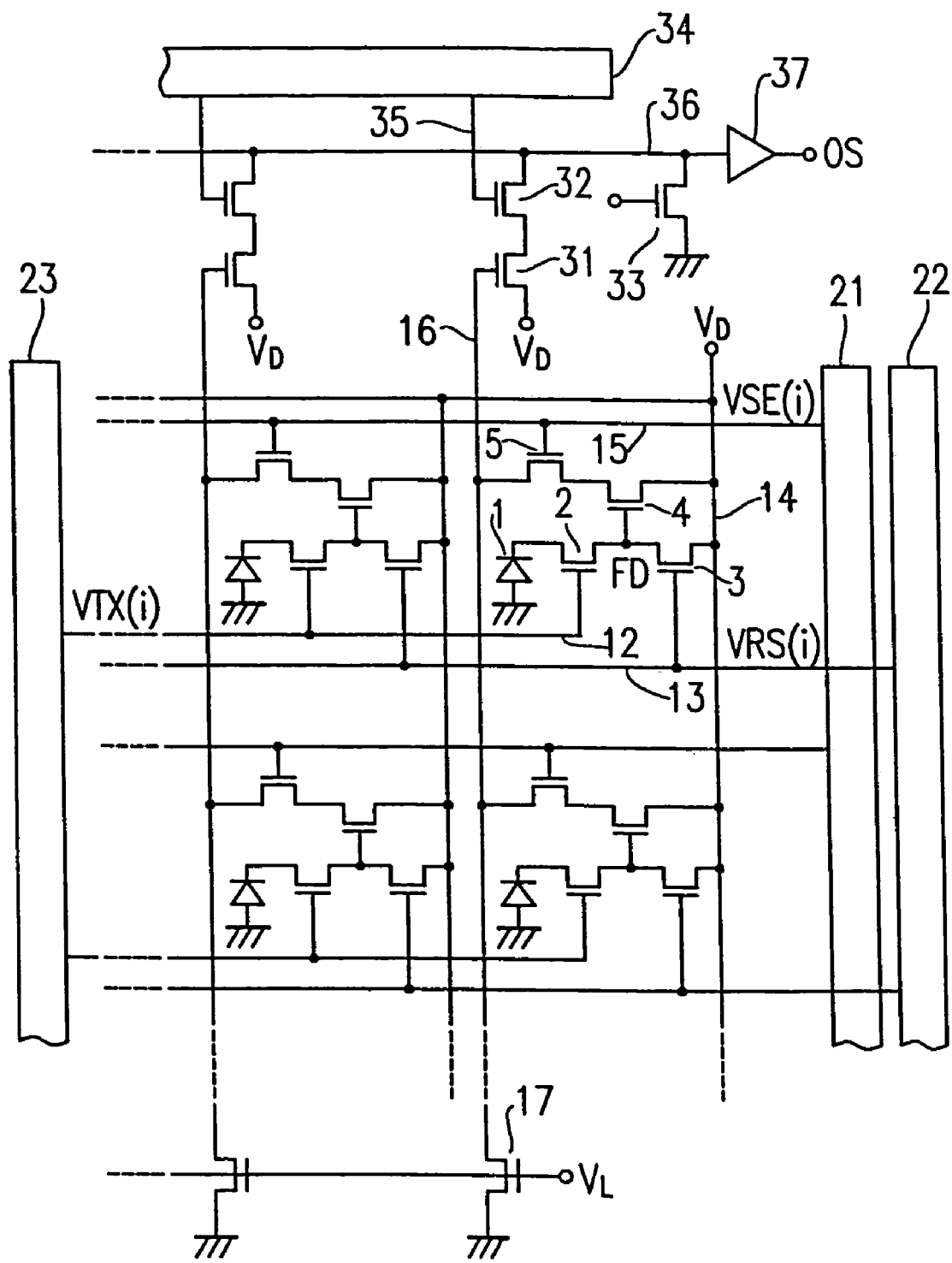
FIG. 7 is a circuit diagram illustrating a conventional solid imaging device structure.
Figure 8:
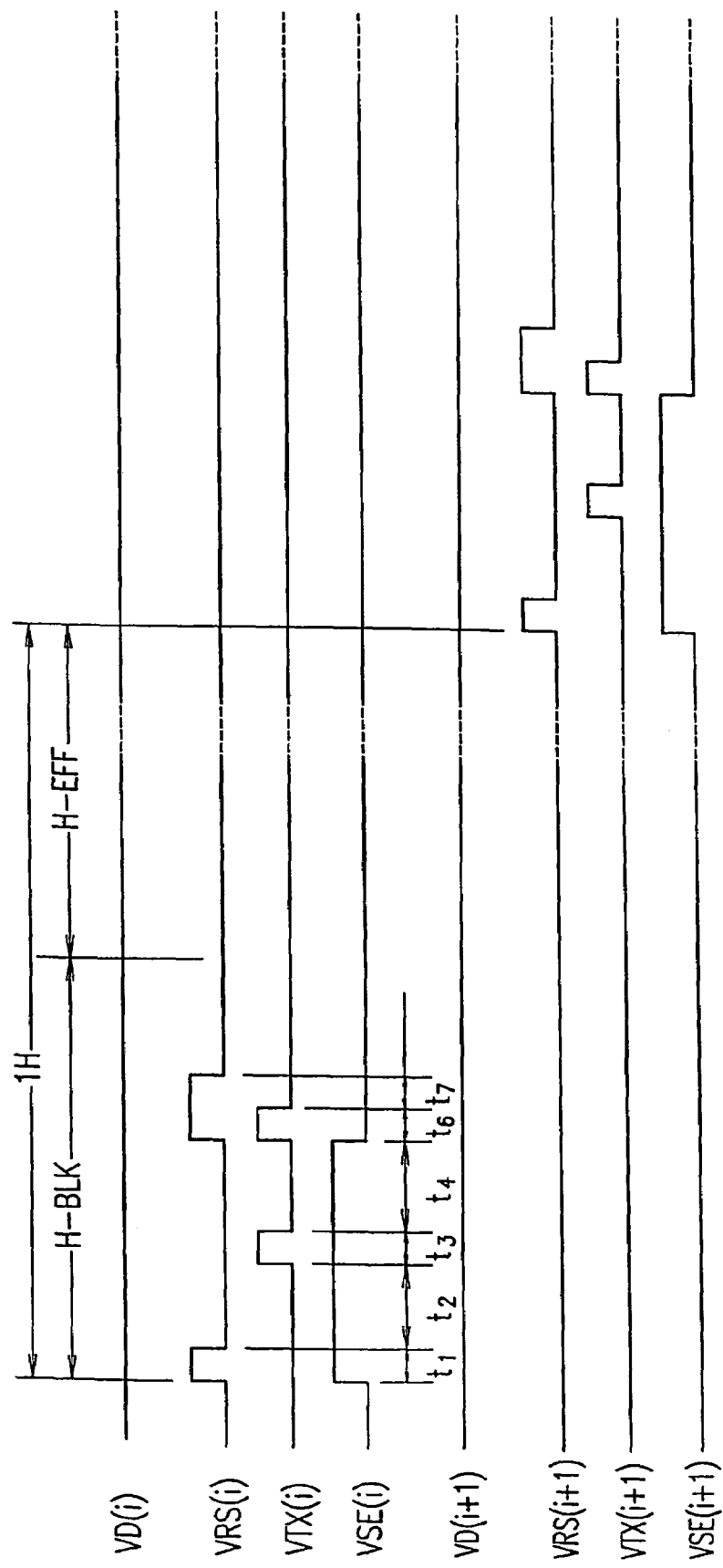
FIG. 8 is a timing diagram illustrating various driving pulse voltages used in a conventional solid imaging device structure.

FIG. 6 is a timing diagram illustrating the circuit operation of the solid imaging device having the structure shown in FIG. 5. Signals from pixels which are selected by the pixel selection transistor 5 during periods t1 to t4 are read to the vertical signal line 16.

During a period t2, a potential signal generated immediately after resetting the charge detection node FD appears at the charge detection node FD. During a period t4, a potential signal corresponding to the signal charge which has been read from the photodiode 1 (PD) appears at the charge detection node FD. Both potential signals are referenced to a reset level potential energy. Accordingly, the CDS circuit 18 clamps an image signal with a clamp pulse $\phi_{CL}$ during the period t2, and samples and holds an image signal with a sample/hold pulse $\phi_{SH}$ during the period t4, thereby deriving a difference between the potential signal which is available immediately after resetting the charge detection node FD and the potential signal which is available immediately after charge has been transferred from the photodiode 1 (PD) to the charge detection node FD. In other words, a sample/hold output signal which only reflects the potential variation at the charge detection node FD ascribable to the net signal charge can be obtained; that is, any reset noise which may be generated in response to reset operations and any variation in the offset levels of respective pixels can be cancelled, so that a very low-noise, high-quality image signal can be obtained.

Although the aforementioned CDS circuit 18 is illustrated as combining a clamp circuit and a sample/hold circuit, the present invention is not limited thereto. Any other image signal detection method may be employed, e.g., sampling and holding a signal immediately after resetting the charge detection node FD to obtain a first signal, sampling and holding a signal immediately after charge has been transferred from the photodiode 1 (PD) to the charge detection node FD to obtain a second signal, and deriving a difference between the first and second signals by means of a differential amplifier or the like.

As described above, in accordance with the solid imaging device of the present invention, in which drains of respective reset gate transistors are interconnected along a horizontal direction, independently from row-to-row, pulse voltages from a scanning circuit are sequentially applied to the drains while maintaining a transfer gate transistor and a reset gate transistor in an ON state. As a result, a photodiode is maintained at a fixed potential level at every read operation, thereby preventing the residual image phenomenon. As a result, image signals can be obtained with low noise and high sensitivity, such that high image quality can be obtained, without introducing substantial changes in the component elements of each pixel.

Furthermore, by ensuring that a charge transfer period from the photodiode to the charge detection node is equal in length to a period from a completion of charge injection from the drain into the photodiode until turning off the transfer gate transistor, time-dependent components can be eliminated from residual images, thereby accurately suppressing the residual image phenomenon.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A solid imaging device comprising at least one pixel, the pixel including a photoelectric conversion section and a charge detection node which are coupled to or decoupled from each other via a transfer gate transistor, the charge detection node being coupled to or decoupled from a drain of a reset gate transistor via the reset gate transistor,
   wherein, after the reset gate resets a potential of the charge detection node, the transfer gate transistor is turned ON so as to allow a signal charge to be transferred from the photoelectric conversion section to the charge detection node, and thereafter a potential of the drain is changed from a HIGH state to a LOW state to a HIGH state while both of the transfer gate transistor and the reset gate transistor are maintained in an ON state.

2. A solid imaging device according to claim 1, further comprising an amplification transistor for amplifying a variation in the potential of the charge detection node and a pixel selection transistor for selectively reading an output signal from the amplification transistor,
   wherein the potential of the drain is varied after an amplified signal of the signal charge is read via the amplification transistor and the pixel selection transistor, thereby presetting a potential of the photoelectric conversion section to a constant potential after the read operation.

3. A solid imaging device according to claim 2, wherein the transfer gate transistor, the reset gate transistor, the amplification transistor, and the pixel selection transistor are formed of MOS transistors of a same polarity type.

4. A solid imaging device according to claim 3, wherein the transfer gate transistor and the reset gate transistor are embedded channel-type MOS transistors.

5. A solid imaging device according to claim 4, wherein a HIGH level of a pulse voltage for driving the transfer gate transistor is lower than a HIGH level of a pulse voltage for driving the reset gate transistor.

6. A solid imaging device according to claim 1, wherein a period t1 during which the signal charge is transferred from the photoelectric conversion section to the charge detection node and a period t2 after the potential of the drain is changed from the LOW state to the HIGH state until the transfer gate transistor is turned OFF satisfy the relationship t1=t2.

7. A solid imaging device according to claim 1 wherein a plurality of said pixels are arranged in a matrix,
   wherein the drains of the reset gate transistors in each row of the matrix are interconnected, independently from row-to-row, so as to be connected to a scanning circuit, and
   wherein the scanning circuit sequentially applies pulse voltages to the drains on a row-by-row basis.

8. A solid imaging device according to claim 1, further comprising a correlated double sampling circuit for calculating a difference between a signal charge immediately after the potential of the charge detection node is reset and a signal charge immediately after the signal charge is transferred from the photoelectric conversion section to the charge detection node, and outputting the calculated difference as a net signal component representing a net signal charge.

9. A method for driving a solid imaging device comprising at least one pixel, the pixel including a photoelectric conversion section and a charge detection node which are coupled to or decoupled from each other via a transfer gate transistor, the charge detection node being coupled to or decoupled from a drain of a reset gate transistor via the reset gate transistor, wherein the method comprises the steps of:
  resetting via the reset gate transistor a potential of the charge detection node;
  thereafter allowing a signal charge to be transferred from the photoelectric conversion section to the charge detection node by turning the transfer gate transistor ON; and
  thereafter changing a potential of the drain from a HIGH state to a LOW state to a HIGH state while maintaining both of the transfer gate transistor and the reset gate transistor in an ON state.

10. A method according to claim 9, wherein the solid imaging device further comprises an amplification transistor for amplifying a variation in the potential of the charge detection node and a pixel selection transistor for selectively reading an output signal from the amplification transistor,
  the method further comprising, after the step allowing the signal charge to be transferred, a step of varying the potential of the drain after an amplified signal of the signal charge is read via the amplification transistor and the pixel selection transistor,
  thereby presetting a potential: of the photoelectric conversion section to a constant potential after the or each read operation.

11. A method according to claim 10, wherein the transfer gate transistor, the reset gate transistor, the amplification transistor, and the pixel selection transistor are formed of MOS transistors of a same polarity type.

12. A method according to claim 11, wherein the transfer gate transistor and the reset gate transistor are embedded channel-type MOS transistors.

13. A method according to claim, 12, wherein a HIGH level of a pulse voltage for driving the transfer gate transistor is lower than a HIGH level of a pulse voltage for driving the reset gate transistor.

14. A method according to claim 9, wherein a period t1 for performing a charge transfer from the photoelectric conversion section to the charge detection node and a period t2 after the potential of the drain is changed from the LOW state to the HIGH state until the transfer gate is turned OFF satisfy the relationship t1 t2.

15. A method according to claim 9, wherein a plurality of said pixels are arranged in a matrix,
  wherein the drains of the reset gate transistors in each row of the matrix are interconnected, independently from row-to-row, so as to be connected to a scanning circuit, the method further comprising the step of:
  sequentially applying from the scanning circuit pulse voltages to the drains on a row-to-row basis.

16. A method according to claim 9, wherein the solid imaging device further comprises a correlated double sampling circuit for calculating a difference between a signal charge immediately after the potential of the charge detection node is reset and a signal charge immediately after the signal charge is transferred from the photoelectric conversion section to the charge detection node, and outputting the calculated difference as a net signal component representing a net signal charge.

* * * * *